US012604869B2

(12) United States Patent
Li et al.

(10) Patent No.: US 12,604,869 B2
(45) Date of Patent: Apr. 21, 2026

(54) FULL-CYCLE HEALTH DETECTION SYSTEM FOR DAIRY COW BASED ON VISUAL RECOGNITION

(71) Applicant: HANGZHOU DIANZI UNIVERSITY, Hangzhou City (CN)

(72) Inventors: Xiaodong Li, Hangzhou City (CN); Zhengsheng Yu, Hangzhou City (CN); Zhaozhe Gong, Hangzhou City (CN)

(73) Assignee: HANGZHOU DIANZI UNIVERSITY, Hangzhou City (CN)

( * ) Notice: Subject to any disclaimer, the term of this patent is extended or adjusted under 35 U.S.C. 154(b) by 465 days.

(21) Appl. No.: 18/173,866

(22) Filed: Feb. 24, 2023

(65) Prior Publication Data

US 2023/0354781 A1 Nov. 9, 2023

(30) Foreign Application Priority Data

May 7, 2022 (CN) .......................... 202210493155.8

(51) Int. Cl.
| | |
|---|---|
| *A01K 29/00* | (2006.01) |
| *A01K 11/00* | (2006.01) |
| *G06T 7/11* | (2017.01) |
| *G06T 7/136* | (2017.01) |
| *G06T 7/62* | (2017.01) |

(52) U.S. Cl.
CPC .......... *A01K 29/005* (2013.01); *A01K 11/006* (2013.01); *G06T 7/11* (2017.01); *G06T 7/136* (2017.01); *G06T 7/62* (2017.01); *G06T 2207/10032* (2013.01); *G06T 2207/20081* (2013.01); *G06T 2207/30004* (2013.01)

(58) Field of Classification Search
USPC ......................................................... 382/110
See application file for complete search history.

(56) References Cited

U.S. PATENT DOCUMENTS

| | | | | |
|---|---|---|---|---|
| 7,214,128 B2 * | 5/2007 | Kriesel | .................. | A22B 5/201 |
| | | | | 452/157 |
| 2005/0120965 A1 * | 6/2005 | Van Den Berg | ........ | A01J 5/003 |
| | | | | 119/14.02 |

(Continued)

FOREIGN PATENT DOCUMENTS

| | | | | | |
|---|---|---|---|---|---|
| NL | 2028749 B1 * | 1/2023 | .............. | G06T 7/60 |
| WO | WO-2022077113 A1 * | 4/2022 | ........... | G06V 30/147 |

*Primary Examiner* — Chineyere Wills-Burns
*Assistant Examiner* — Aaron Timothy Bonansinga
(74) *Attorney, Agent, or Firm* — DLA PIPER LLP (US)

(57) ABSTRACT

The present disclosure provides a full-cycle health detection system for a dairy cow based on visual recognition, including: electronic chips provided with dairy cow identifiers (IDs), and fixed on dairy cows; an online acquisition device configured to acquire an image of a to-be-detected dairy cow online and recognize a dairy cow ID, and transmit an acquired image of the to-be-detected dairy cow and the dairy cow ID to a master control module; the master control module provided with an image recognition algorithm and a health determination algorithm; and the storage module configured to store full-cycle growth information of dairy cows corresponding to all of the dairy cow IDs and standard full-cycle growth information of the dairy cows. The present disclosure can use visual recognition instead of the manual measurement, and can determine growth and health states of the dairy cow quickly and accurately.

5 Claims, 2 Drawing Sheets

(56)          References Cited

U.S. PATENT DOCUMENTS

| | | | |
|---|---|---|---|
| 2007/0022967 A1* | 2/2007 | Doyle, II | A22B 5/007 |
| | | | 119/416 |
| 2011/0196661 A1* | 8/2011 | Spicola | A01K 29/00 |
| | | | 703/11 |
| 2012/0275659 A1* | 11/2012 | Gomas | G06V 10/46 |
| | | | 382/110 |
| 2013/0151310 A1* | 6/2013 | Pratt | A01K 1/0209 |
| | | | 119/51.02 |
| 2013/0261470 A1* | 10/2013 | Allison | A61B 5/7278 |
| | | | 600/476 |
| 2013/0319336 A1* | 12/2013 | Thompson | A01K 29/005 |
| | | | 119/14.02 |
| 2015/0257356 A1* | 9/2015 | Hofman | A01J 7/04 |
| | | | 119/14.08 |
| 2018/0350054 A1* | 12/2018 | Fox | G08G 5/55 |
| 2020/0396962 A1* | 12/2020 | Wallace | A61D 17/002 |
| 2021/0037785 A1* | 2/2021 | Yabe | G06N 20/10 |
| 2021/0045361 A1* | 2/2021 | Dumm | A01K 29/00 |

* cited by examiner

FULL-CYCLE HEALTH DETECTION SYSTEM FOR DAIRY COW BASED ON VISUAL RECOGNITION

CROSS REFERENCE TO RELATED APPLICATION

This patent application claims the benefit and priority of Chinese Patent Application No. 202210493155.8, filed with the China National Intellectual Property Administration on May 7, 2022, the disclosure of which is incorporated by reference herein in its entirety as part of the present application.

TECHNICAL FIELD

The present disclosure relates to the technical field of size detection on dairy cows, and in particular to a full-cycle health detection system for a dairy cow based on visual recognition.

BACKGROUND

With the development of scientific technologies and advent of big data era, informatization and intellectualization of animal husbandry are envisioned as top priorities to promote quick and sound development of the animal husbandry in China. By virtue of intelligent and automatic data acquisition and computer-aided analysis, the production scale of the animal husbandry can be increased, the labor cost can be reduced, and the production efficiency can be improved. Body size indexes of cattle mainly include parameters such as a body height, a body length, a body dip length, a chest circumference, a cannon circumference, and a hip width. With the development of bioresearch and constant experience accumulation of herders, people have recognized that measurements on bodies of the cattle are widely applicable and valuable, including monitoring and predicting growth rates, development states, physical features and dietary states of the cattle for identification, transaction and breeding of the cattle. Measurements on body sizes and weights of dairy cows will bring practical economic values.

For a long time, the body sizes of the dairy cows must be measured manually. Specifically, a dairy cow stands upright on a flat ground, with body sizes measured by a measuring stick, a tape, and a circular measurer. To measure a weight, the dairy cow is often driven to a special region with a weighing device. Such a measurement has many shortages: The dairy cow is controlled difficultly for a large size. Each body size index of the dairy cow is measured independently and manually to cause a high workload. Due to manual operation, there is a certain deviation in accuracy of the obtained body size index. In addition, with direct contact with the cow, it is likely to cause a stress response of the cow, and even cause dangers or adverse factors to the cow.

In contrast to high requirements on manpower and machinery in weight measurement of the dairy cow, body sizes are measured more simply and thus a number of scholars in home and abroad put forward to estimate the weight of the dairy cow with the body size indexes.

Specifically, a plurality of body size indexes of the dairy cow are measured manually with a ranging tool, while a weight of the dairy cow is obtained with a weighing device. Relationships between the weight and the body size indexes of the dairy cow are fitted and induced with a statistical method. After a fitting formula is obtained, measuring body size indexes of a dairy cow can calculate a corresponding weight. However, such a manual measurement is implemented hardly, with a high cost, a slow speed, and a stress response of the dairy cow.

SUMMARY

The present disclosure provides a full-cycle health detection system for a dairy cow based on visual recognition, to solve problems of a high cost, a slow speed, and a stress response of the dairy cow in manual measurement. The present disclosure can use visual recognition instead of the manual measurement, and can determine growth and health states of the dairy cow quickly and accurately.

To achieve the above objective, the present disclosure provides the following technical solutions:

A full-cycle health detection system for a dairy cow based on visual recognition includes:

electronic chips provided with dairy cow identifiers (IDs), and fixed on dairy cows;

an online acquisition device configured to acquire an image of a to-be-detected dairy cow online and recognize a dairy cow ID, and transmit an acquired image of the to-be-detected dairy cow and the dairy cow ID to a master control module;

the master control module provided with an image recognition algorithm and a health determination algorithm, where the image recognition algorithm obtains a measured growth cycle of the dairy cow and a weight of the dairy cow according to a received image of the to-be-detected dairy cow; and the health determination algorithm calls corresponding full-cycle growth information of the dairy cow in a storage module according to the dairy cow ID, determines a health state of the dairy cow, and updates the full-cycle growth information of the dairy cow; and the storage module configured to store full-cycle growth information of dairy cows corresponding to all of the dairy cow IDs and standard full-cycle growth information of the dairy cows.

The present disclosure acquires the image of the to-be-detected dairy cow based on the visual recognition, and determines the growth and health states of the dairy cow through the image recognition algorithm and the health determination algorithm. In combination with a vision and a mass, the present disclosure obtains area parameters with the visual recognition and converts the area parameters into mass parameters, thereby obtaining a corresponding mass of the dairy cow in each growth cycle. The present disclosure can use the visual recognition instead of manual measurement, determines the growth and health states of the dairy cow quickly and accurately, prevents an error in manual detection, and makes detection results more accurate.

Preferably, the online acquisition device includes an unmanned aerial vehicle (UAV); a first camera, a second camera, a distance sensor and a chip recognizer are fixed below the UAV; the first camera is configured to photograph a top view image of the dairy cow; the second camera is configured to photograph a side view image of the dairy cow; the distance sensor is configured to recognize a distance between the UAV and a ground; and the chip recognizer is configured to recognize the dairy cow ID.

Generally, the electronic chips are nailed on ears of the dairy cows. In actual use, the UAV is operated to get close to the to-be-detected dairy cow, such that the dairy cow ID is recognized by the chip recognizer. The top view image of the dairy cow is photographed by the first camera, and the side view image of the dairy cow is photographed by the second camera. When the top view image of the dairy cow is photographed, the distance sensor works at the same time to record a distance between the UAV and the ground at present for subsequent normalization, so as not to cause an error for an image size.

Preferably, an offline acquisition device is provided; the offline acquisition device includes a single-channel fence outside a cowshed door; a weighing device is provided on a ground in the single-channel fence; a third camera is provided above the weighing device; a fourth camera is provided outside the single-channel fence; and the weighing device, the third camera and the fourth camera are electrically connected to the master control module.

With the offline acquisition device, the present disclosure acquires plenty of top view images and side view images and corresponding weights of the dairy cow conveniently in each growth cycle to train a subsequent algorithmic model and improve the algorithmic accuracy.

Preferably, the image recognition algorithm includes a growth cycle recognition algorithm and a weight measurement algorithm; the image of the to-be-detected dairy cow includes a top view image and a side view image of the to-be-detected dairy cow; the growth cycle recognition algorithm obtains the measured growth cycle of the dairy cow according to the top view image of the to-be-detected dairy cow; and the weight measurement algorithm calculates, according to the side view image, the weight of the dairy cow corresponding to the measured growth cycle.

Preferably, a specific process that the growth cycle recognition algorithm obtains the measured growth cycle of the dairy cow according to the top view image of the to-be-detected dairy cow includes:

S1: extracting a cow's back image from the top view image, and extracting cow's back contour data from the cow's back image;

S2: calculating a measured torso length of the dairy cow according to the cow's back contour data; and S3: mating the measured torso length of the dairy cow with a standard torso length of the dairy cow, and taking a growth cycle corresponding to a closest standard torso length of the dairy cow to the measured torso length of the dairy cow as the measured growth cycle of the to-be-detected dairy cow.

The present disclosure determines the growth cycle with the cow's back, so as to improve an accuracy of determination. The cow has a different body size in each growth cycle, and the difference in skeletal development is most obvious, so the length of the skeleton from the cow's back is more accurate than that from the side view image, and thus the determination result is more accurate.

Preferably, S2 specifically includes the following steps:

S21: taking two feature points at a furthest relative distance in the cow's back contour data, the two feature points dividing a cow's back contour into an upper contour line and a lower contour line;

S22: dividing the upper contour line into n equal parts, correspondingly providing upper endpoints between adjacent ones of the equal parts, dividing the lower contour line into n equal parts, correspondingly providing lower endpoints between adjacent ones of the equal parts, and connecting the upper and lower endpoints to obtain a plurality of equal segments;

S23: seeking midpoints of all of the equal segments between the two feature points, and sequentially connecting all of the midpoints from a first feature point to a second feature point to obtain a torso fold line of the dairy cow; and S24: taking a length for the torso fold line of the dairy cow as the torso length of the dairy cow.

Based on a feature that the torso of the dairy cow is nearly symmetric along a vertebral column, the present disclosure can obtain a position of the vertebral column of the dairy cow according to a symmetric centerline of the cow's back contour. Since the dairy cow stands at different postures, the photographed cow's back image is not completely straight. The present disclosure extracts two feature points inventively to divide the cow's back contour into the upper contour line and the lower contour line, thereby obtaining the torso fold line of the dairy cow. The torso fold line of the dairy cow is approximate to the shape of the vertebral column of the dairy cow, and thus the present disclosure yields a higher detection accuracy.

Preferably, a process for obtaining the standard torso length of the dairy cow is as follows:

S31: acquiring a plurality of top view images corresponding to each of growth cycles of the dairy cow;

S32: extracting a cow's back image from each of the top view images, and extracting cow's back contour data from the cow's back image;

S33: calculating, according to the cow's back contour data, a torso length of the dairy cow corresponding to the growth cycle; and S34: performing training according to the plurality of top view images to obtain all torso lengths of the dairy cow corresponding to the growth cycle, and calculating the standard torso length of the dairy cow with the all torso lengths of the dairy cow corresponding to the growth cycle.

Preferably, a specific process that the weight measurement algorithm calculates, according to the side view image, the weight of the dairy cow corresponding to the measured growth cycle is as follows:

SA: acquiring a mass density corresponding to each of growth cycles of the dairy cow, and photographing and weighing the dairy cow in the growth cycle to obtain a plurality of side view images of the dairy cow containing weight information; pre-processing each of the side view images of the dairy cow to obtain a monochrome image; segmenting the monochrome image based on a threshold segmentation algorithm to obtain connected domains, and calculating an area for all of the connected domains to obtain a side view area of the dairy cow; and calculating the mass density=the weight/the side view area; and SB: pre-processing the side view image to obtain a side view area of the dairy cow, and taking a product of the side view area and a mass density corresponding to the measured growth cycle as the weight of the dairy cow.

Preferably, the health determination algorithm includes the following steps:

S4: determining whether the measured growth cycle is the same as an actual growth cycle, executing S5 if yes, and determining that the dairy cow grows unhealthily if no, where the actual growth cycle may be obtained from the storage module through the dairy cow ID; and S5: determining whether the predicted weight falls within a standard weight range of the corresponding growth cycle, determining that the dairy cow grows healthily if yes, and determining that the dairy cow grows unhealthily if no, where the standard weight range of the corresponding growth cycle may be obtained from the storage module through the dairy cow ID.

The present disclosure has the following beneficial effects: The present disclosure acquires the image of the to-be-detected dairy cow based on the visual recognition, and determines the growth and health states of the dairy cow through the image recognition algorithm and the health determination algorithm. In combination with a vision and a mass, the present disclosure obtains area parameters with the visual recognition and converts the area parameters into mass parameters, thereby obtaining a corresponding mass of the dairy cow in each growth cycle. The present disclosure can use the visual recognition instead of manual measurement, determines the growth and health states of the dairy cow quickly and accurately, prevents an error in manual detection, and makes detection results more accurate.

In the figures: 1: UAV, 2: first camera, 3: second camera, 4: distance sensor, 5: chip recognizer, 6: cowshed door, 7: single-channel fence, 8: weighing device, 9: third camera, and 10: fourth camera.

DETAILED DESCRIPTION OF THE EMBODIMENTS

Embodiment

Figure 1:
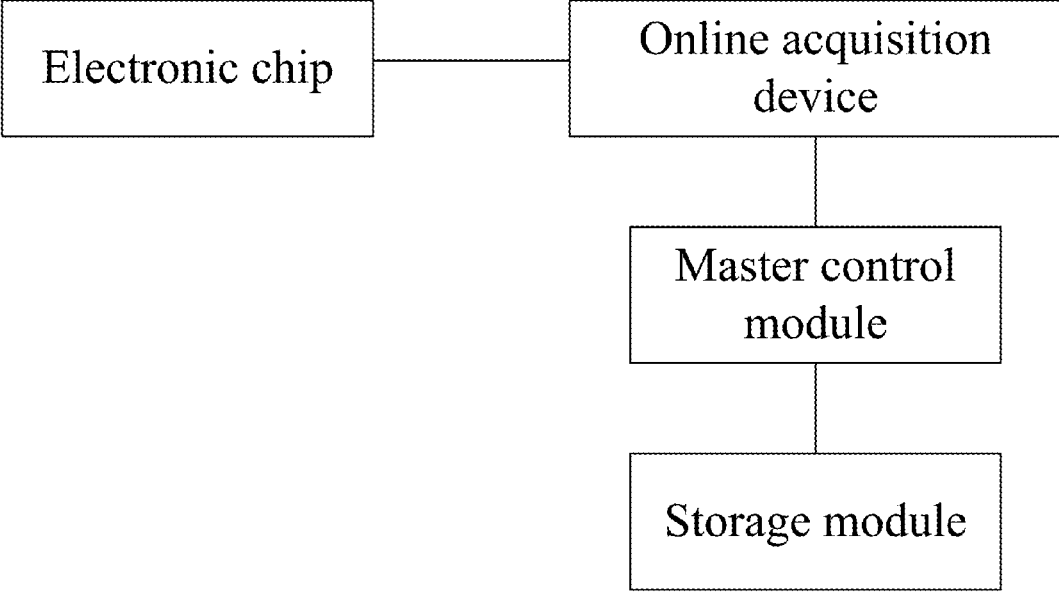
FIG. 1 illustrates a system composition according to an embodiment.

Referring to FIG. 1, the embodiment provides a full-cycle health detection system for a dairy cow based on visual recognition, including: electronic chips, an online acquisition device, a master control module, and a storage module.

The electronic chips are provided with dairy cow IDs, and fixed on dairy cows.

Figure 2:
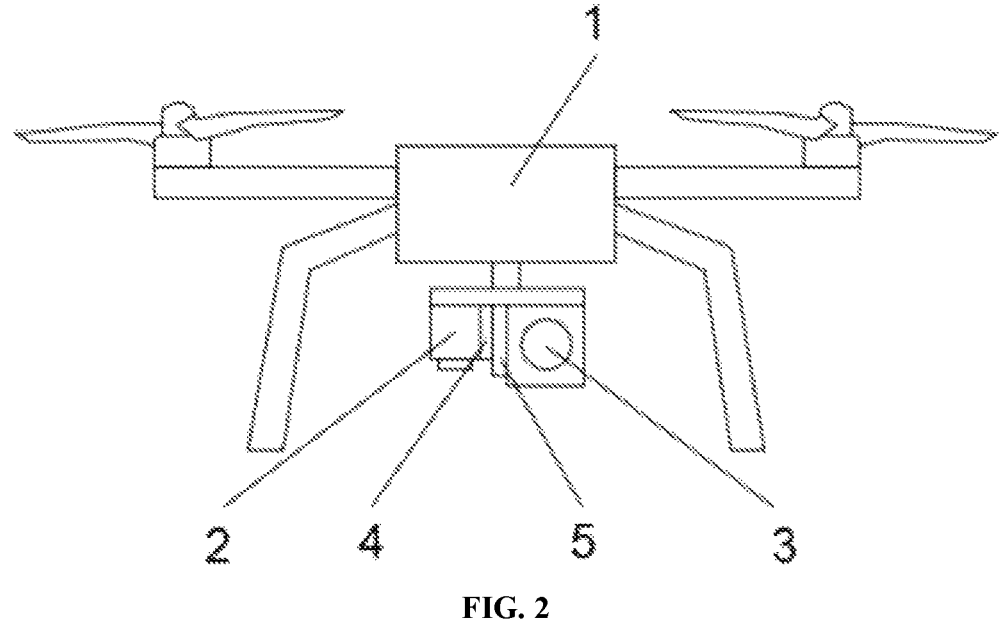
FIG. 2 illustrates a structure of an online acquisition device according to an embodiment.

The online acquisition device is configured to acquire an image of a to-be-detected dairy cow online and recognize a dairy cow ID, and transmit an acquired image of the to-be-detected dairy cow and the dairy cow ID to the master control module. Referring to FIG. 2, the online acquisition device in the embodiment includes an UAV 1. A first camera 2, a second camera 3, a distance sensor 4 and a chip recognizer 5 are fixed below the UAV 1. The first camera 2 is configured to photograph a top view image of the dairy cow. The second camera 3 is configured to photograph a side view image of the dairy cow. The distance sensor 4 is configured to recognize a distance between the UAV and a ground. The chip recognizer 5 is configured to recognize the dairy cow ID.

The master control module is provided with an image recognition algorithm and a health determination algorithm. The image recognition algorithm obtains a measured growth cycle of the dairy cow and a weight of the dairy cow according to a received image of the to-be-detected dairy cow. The health determination algorithm calls corresponding full-cycle growth information of the dairy cow in the storage module according to the dairy cow ID, determines a health state of the dairy cow, and updates the full-cycle growth information of the dairy cow.

The image recognition algorithm includes a growth cycle recognition algorithm and a weight measurement algorithm. The image of the to-be-detected dairy cow includes a top view image and a side view image of the to-be-detected dairy cow. The growth cycle recognition algorithm obtains the measured growth cycle of the dairy cow according to the top view image of the to-be-detected dairy cow. The weight measurement algorithm calculates, according to the side view image, the weight of the dairy cow corresponding to the measured growth cycle.

The storage module is configured to store full-cycle growth information of dairy cows corresponding to all of the dairy cow IDs and standard full-cycle growth information of the dairy cows.

Figure 3:
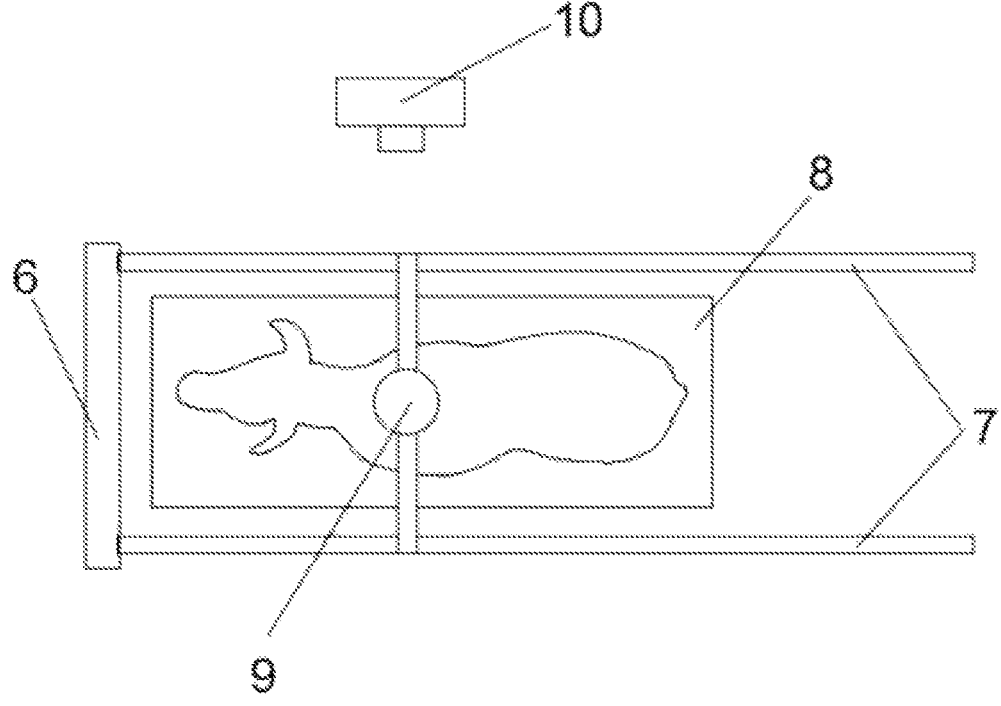
FIG. 3 illustrates a structure of an offline acquisition device according to an embodiment.

In the embodiment, an offline acquisition device is further provided. Referring to FIG. 3, the offline acquisition device includes a single-channel fence 7 outside a cowshed door 6. A weighing device 8 is provided on a ground in the single-channel fence 7. A third camera 9 is provided above the weighing device 8. A fourth camera 10 is provided outside the single-channel fence 7. The weighing device 8, the third camera 9 and the fourth camera 10 are electrically connected to the master control module.

The present disclosure acquires the image of the to-be-detected dairy cow based on the visual recognition, and determines the growth and health states of the dairy cow through the image recognition algorithm and the health determination algorithm. In combination with a vision and a mass, the present disclosure obtains area parameters with the visual recognition and converts the area parameters into mass parameters, thereby obtaining a corresponding mass of the dairy cow in each growth cycle. The present disclosure can use the visual recognition instead of manual measurement, determines the growth and health states of the dairy cow quickly and accurately, prevents an error in manual detection, and makes detection results more accurate.

Generally, the electronic chips are nailed on ears of the dairy cows. In actual use, the UAV is operated to get close to the to-be-detected dairy cow, such that the dairy cow ID is recognized by the chip recognizer 5. The top view image of the dairy cow is photographed by the first camera 2, and the side view image of the dairy cow is photographed by the second camera 3. When the top view image of the dairy cow is photographed, the distance sensor 4 works at the same time to record a distance between the UAV and the ground at present for subsequent normalization, so as not to cause an error for an image size.

With the offline acquisition device, the present disclosure acquires plenty of top view images and side view images and corresponding weights of the dairy cow conveniently in each growth cycle to train a subsequent algorithmic model and improve the algorithmic accuracy.

A specific process that the growth cycle recognition algorithm obtains the measured growth cycle of the dairy cow according to the top view image of the to-be-detected dairy cow is as follows:

S1: Extract a cow's back image from the top view image, and extract cow's back contour data from the cow's back image.

The cow's back in the top view image is extracted with a cow's back extraction algorithm, and a portion irrelevant to the cow's back is removed, thereby obtaining the cow's back image. A plurality of contour data in the cow's back image are obtained with an edge detection algorithm. The plurality of contour data are sorted according to a sequence from inside to outside. An outermost layer of the contour data serves as the cow's back contour data, and the cow's back contour data are normalized. Normalization in the present disclosure is intended to prevent a photographing distance from affecting the image size to cause an error.

Figure 4:
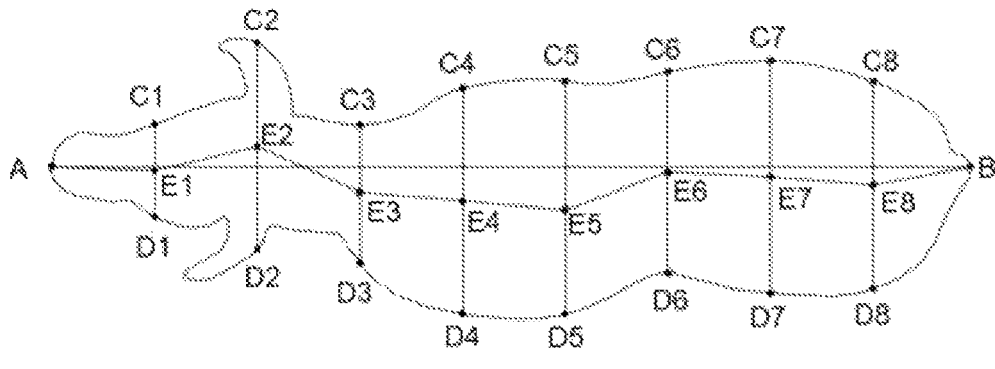
FIG. 4 schematically illustrates a contour of a cow's back according to an embodiment.

S2: Calculate a measured torso length of the dairy cow according to the cow's back contour data. S2 specifically includes the following steps:

S21: Take two feature points at a furthest relative distance in the cow's back contour data, the two feature points dividing a cow's back contour into an upper contour line and a lower contour line, as shown by a point A and a point B in FIG. 4.

S22: Divide the upper contour line into nine equal parts, correspondingly provide upper endpoints C1, C2, C3, C4, C5, C6, C7 and C8 between adjacent ones of the equal parts, divide the lower contour line into nine equal parts, correspondingly provide lower endpoints D1, D2, D3, D4, D5, D6, D7 and D8 between adjacent ones of the equal parts, and connect the upper and lower endpoints to obtain a plurality of equal segments that are a segment C1D1, a segment C2D2, a segment C3D3, a segment C4D4, a segment C5D5, a segment C6D6, a segment C7D7, and a segment C8D8.

S23: Seek midpoints of all of the equal segments between the two feature points, namely seek midpoints E1, E2, E3, E4, E5, E6, E7, and E8 of the segment C1D1, the segment C2D2, the segment C3D3, the segment C4D4, the segment C5D5, the segment C6D6, the segment C7D7, and the segment C8D8, and connect all of the midpoints sequentially from the point A to the point B to obtain a torso fold line of the dairy cow.

S24: Take a length for the torso fold line of the dairy cow as the torso length of the dairy cow.

Based on a feature that the torso of the dairy cow is nearly symmetric along a vertebral column, the present disclosure can obtain a position of the vertebral column of the dairy cow according to a symmetric centerline of the cow's back contour. Since the dairy cow stands at different postures, the photographed cow's back image is not completely straight. The present disclosure extracts two feature points inventively to divide the cow's back contour into the upper contour line and the lower contour line, thereby obtaining the torso fold line of the dairy cow. The torso fold line of the dairy cow is approximate to the shape of the vertebral column of the dairy cow, and thus the present disclosure yields a higher detection accuracy.

S3: Mate the measured torso length of the dairy cow with a standard torso length of the dairy cow, and take a growth cycle corresponding to a closest standard torso length of the dairy cow to the measured torso length of the dairy cow as the measured growth cycle of the to-be-detected dairy cow.

The present disclosure determines the growth cycle with the cow's back, so as to improve an accuracy of determination. The cow has a different body size in each growth cycle, and the difference in skeletal development is most obvious, so the length of the skeleton from the cow's back is more accurate than that from the side view image, and thus the determination result is more accurate.

A process for obtaining the standard torso length of the dairy cow is as follows:

S31: Acquire a plurality of top view images corresponding to each of growth cycles of the dairy cow;

S32: Extract a cow's back image from each of the top view images, and extract cow's back contour data from the cow's back image.

S33: Calculate, according to the cow's back contour data, a torso length of the dairy cow corresponding to the growth cycle.

S34: Perform training according to the plurality of top view images to obtain all torso lengths of the dairy cow corresponding to the growth cycle, and calculate the standard torso length of the dairy cow with the all torso lengths of the dairy cow corresponding to the growth cycle. Under the training of the plurality of top view images, front 30% and rear 30% of the torso lengths of the dairy cow are removed based on a Gaussian distribution. A mean for middle 40% of the torso lengths of the dairy cow is taken as the standard torso length of the dairy cow corresponding to the growth cycle. In order to improve an accuracy of model recognition, an average is computed with the Gaussian distribution to obtain the standard torso length of the dairy cow, and a part of image interferences of the dairy cow with premature development or retarded development are removed.

A specific process that the weight measurement algorithm calculates, according to the side view image, the weight of the dairy cow corresponding to the measured growth cycle is as follows:

SA: Obtain a mass density corresponding to each of growth cycles of the dairy cow, and photograph and weigh the dairy cow in the growth cycle to obtain a plurality of side view images of the dairy cow containing weight information. Pre-process each of the side view images of the dairy cow to obtain a monochrome image. Segment the monochrome image based on a threshold segmentation algorithm to obtain connected domains, and calculate an area for all of the connected domains to obtain a side view area of the dairy cow. Calculate the mass density=the weight/the side view area. When the mass density of the dairy cow corresponding to the growth cycle is obtained, repeated training is performed according to the plurality of side view images of the dairy cow to obtain all mass densities corresponding to the cycle. Front 30% and rear 30% of the mass densities are removed based on a Gaussian distribution. A mean for middle 40% of the mass densities is taken as the mass density corresponding to the growth cycle.

SB: Pre-process the side view image to obtain a side view area of the dairy cow, and take a product of the side view area and a mass density corresponding to the measured growth cycle as the weight of the dairy cow.

The health determination algorithm includes the following steps:

S4: Determine whether the measured growth cycle is the same as an actual growth cycle, execute S5 if yes, and determine that the dairy cow grows unhealthily if no. The actual growth cycle may be obtained from the storage module through the dairy cow ID.

S5: Determine whether the predicted weight falls within a standard weight range of the corresponding growth cycle, determine that the dairy cow grows healthily if yes, and determine that the dairy cow grows unhealthily if no. The standard weight range of the corresponding growth cycle may be obtained from the storage module through the dairy cow ID.

What is claimed is:

1. A full-cycle health detection system for a dairy cow based on visual recognition, comprising:

electronic chips provided with dairy cow identifiers (IDs), and fixed on dairy cows;

an online acquisition device configured to acquire an image of a to-be-detected dairy cow online and recognize a dairy cow ID, and transmit an acquired image of the to-be-detected dairy cow and the dairy cow ID to a master control module;

the master control module provided with an image recognition algorithm and a health determination algorithm, wherein the image recognition algorithm obtains a measured growth cycle of the dairy cow and a weight of the dairy cow according to a received image of the to-be-detected dairy cow; wherein the image recognition algorithm comprises a growth cycle recognition algorithm and a weight measurement algorithm; and the image of the to-be-detected dairy cow comprises a top view image and a side view image of the to-be-detected dairy cow;

the growth cycle recognition algorithm obtains the measured growth cycle of the dairy cow according to the top view image of the to-be-detected dairy cow; the weight measurement algorithm calculates, according to the side view image, the weight of the dairy cow corresponding to the measured growth cycle;

wherein a specific process that the growth cycle recognition algorithm obtains the measured growth cycle of the dairy cow according to the top view image of the to-be-detected dairy cow is as follows:

extracting a cow's back image from the top view image, and extracting cow's back contour data from the cow's back image;

calculating a measured torso length of the dairy cow according to the cow's back contour data; and mating the measured torso length of the dairy cow with a standard torso length of the dairy cow, and taking a growth cycle corresponding to a closest standard torso length of the dairy cow to the measured torso length of the dairy cow as the measured growth cycle of the to-be-detected dairy cow;

wherein calculating the measured torso length of the dairy cow according to the cow's back contour data comprises:

taking two feature points at a furthest relative distance in the cow's back contour data, the two feature points dividing a cow's back contour into an upper contour line and a lower contour line;

dividing the upper contour line into n equal parts, correspondingly providing upper endpoints between adjacent ones of the equal parts, dividing the lower contour line into n equal parts, correspondingly providing lower endpoints between adjacent ones of the equal parts, and connecting the upper and lower endpoints to obtain a plurality of equal segments;

seeking midpoints of all of the equal segments between the two feature points, and sequentially connecting all of the midpoints from a first feature point to a second feature point to obtain a torso fold line of the dairy cow; and taking a length for the torso fold line of the dairy cow as the torso length of the dairy cow;

wherein a specific process that the weight measurement algorithm calculates, according to the side view image, the weight of the dairy cow corresponding to the measured growth cycle is as follows:

acquiring a mass density corresponding to each of growth cycles of the dairy cow, and photographing and weighing the dairy cow in the growth cycle to obtain a plurality of side view images of the dairy cow containing weight information; pre-processing each of the side view images of the dairy cow to obtain a monochrome image; segmenting the monochrome image based on a threshold segmentation algorithm to obtain connected domains, and calculating an area for all of the connected domains to obtain a side view area of the dairy cow; and calculating the mass density=the weight/the side view area; and pre-processing the side view image to obtain a side view area of the dairy cow, and taking a product of the side view area and a mass density corresponding to the measured growth cycle as the weight of the dairy cow;

the health determination algorithm calls corresponding full-cycle growth information of the dairy cow in a storage module according to the dairy cow ID, determines a health state of the dairy cow, and updates the full-cycle growth information of the dairy cow; and the storage module configured to store full-cycle growth information of dairy cows corresponding to all of the dairy cow IDs and standard full-cycle growth information of the dairy cows.

2. The full-cycle health detection system for a dairy cow based on visual recognition according to claim 1, wherein the online acquisition device comprises an unmanned aerial vehicle (UAV); a first camera, a second camera, a distance sensor and a chip recognizer are fixed below the UAV; the first camera is configured to photograph the top view image of the dairy cow; the second camera is configured to photograph a side view image of the dairy cow; the distance sensor is configured to recognize a distance between the UAV and a ground; and the chip recognizer is configured to recognize the dairy cow ID.

3. The full-cycle health detection system for a dairy cow based on visual recognition according to claim 2, wherein an offline acquisition device is provided; the offline acquisition device comprises a single-channel fence outside a cowshed door; a weighing device is provided on a ground in the single-channel fence; a third camera is provided above the weighing device; a fourth camera is provided outside the single-channel fence; and the weighing device, the third camera and the fourth camera are electrically connected to the master control module.

4. The full-cycle health detection system for a dairy cow based on visual recognition according to claim 1, wherein an offline acquisition device is provided; the offline acquisition device comprises a single-channel fence outside a cowshed door; a weighing device is provided on a ground in the single-channel fence; a third camera is provided above the weighing device; a fourth camera is provided outside the single-channel fence; and the weighing device, the third camera and the fourth camera are electrically connected to the master control module.

5. The full-cycle health detection system for a dairy cow based on visual recognition according to claim 1, wherein a process for obtaining the standard torso length of the dairy cow is as follows:

acquiring a plurality of top view images corresponding to each of growth cycles of the dairy cow;

extracting a cow's back image from each of the top view images, and extracting cow's back contour data from the cow's back image;

calculating, according to the cow's back contour data, a torso length of the dairy cow corresponding to the growth cycle; and performing training according to the plurality of top view images to obtain all torso lengths of the dairy cow corresponding to the growth cycle, and calculating the standard torso length of the dairy cow with the all torso lengths of the dairy cow corresponding to the growth cycle.

* * * * *